United States Patent
Parker-Wood et al.

(10) Patent No.: US 10,037,425 B2
(45) Date of Patent: Jul. 31, 2018

(54) DETECTING SUSPICIOUS FILE PROSPECTING ACTIVITY FROM PATTERNS OF USER ACTIVITY

(71) Applicant: Symantec Corporation, Mountain View, CA (US)

(72) Inventors: Aleatha Parker-Wood, Palo Alto, CA (US); Andrew Gardner, Roswell, GA (US)

(73) Assignee: Symantec Corporation, Mountain View, CA (US)

( * ) Notice: Subject to any disclaimer, the term of this patent is extended or adjusted under 35 U.S.C. 154(b) by 216 days.

(21) Appl. No.: 14/836,804

(22) Filed: Aug. 26, 2015

(65) Prior Publication Data
US 2017/0061123 A1    Mar. 2, 2017

(51) Int. Cl.
*G06F 21/56* (2013.01)
*G06F 21/55* (2013.01)

(52) U.S. Cl.
CPC .......... *G06F 21/552* (2013.01); *G06F 21/556* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 6,742,124 | B1 * | 5/2004 | Kilpatrick | G06F 21/316 713/194 |
| 7,808,916 | B1 * | 10/2010 | Futamura | H04L 63/1416 370/241 |
| 7,814,548 | B2 * | 10/2010 | Mukhopadhyay | G06F 21/552 726/23 |
| 9,306,966 | B2 * | 4/2016 | Eskin | G06F 17/30914 |
| 9,450,979 | B2 * | 9/2016 | Keromytis | G06F 11/08 |
| 2007/0300301 | A1 * | 12/2007 | Cangini | G06F 21/552 726/23 |
| 2008/0120720 | A1 * | 5/2008 | Guo | G06F 21/552 726/23 |
| 2012/0210430 | A1 * | 8/2012 | Boulanger | H04L 63/1416 726/23 |

(Continued)

OTHER PUBLICATIONS

International Search Report and Written Opinion of the International Searching Authority for International Application No. PCT/US2016/039910, dated Sep. 13, 2016, 15 pgs.

*Primary Examiner* — Trang Doan
(74) *Attorney, Agent, or Firm* — Patent Law Works LLP (57) ABSTRACT

Suspicious file prospecting activity is detected based on patterns of file system access. A user's file system access is monitored over a specific time period. A sequence of the file accesses (e.g., represented as path names) made by the user during the time period is recorded. Distances between the recorded file accesses are determined, for example as edit distances. A distance sequence is recorded, comprising a record of the determined distances. The distance sequence is reduced to one or more baseline statistics describing the pattern of the user's access of the file system during the given period of time. At least one subsequent anomaly in the user's access of the file system is detected, by comparing at least one subsequently calculated statistic representing at least one subsequent pattern of the user's file system access to the at least one baseline statistic.

18 Claims, 3 Drawing Sheets

(56) References Cited

U.S. PATENT DOCUMENTS

| | | | |
|---|---|---|---|
| 2014/0165207 A1* | 6/2014 | Engel | H04L 63/1425 726/25 |
| 2015/0235536 A1* | 8/2015 | Libal | G08B 13/22 340/541 |
| 2017/0032274 A1* | 2/2017 | Yu | G06F 17/30598 |

* cited by examiner

DETECTING SUSPICIOUS FILE PROSPECTING ACTIVITY FROM PATTERNS OF USER ACTIVITY

TECHNICAL FIELD

This disclosure pertains generally to computer security, and more specifically to detecting suspicious file prospecting activity from patterns of user activity.

BACKGROUND

File prospecting is the open-ended exploration by a user for file resources within the file system(s) of an organization, where the exact names, locations or content of the target files are unknown. Users within a given organization may prospect legitimately as part of their normal work activities, but such open-ended browsing through the organization's files can also be done illicitly during activities such as data theft or destruction. File prospecting may also occur during the reconnaissance phase of targeted advanced persistence threat ("APT") attacks, in which an unauthorized party gains access to a computer system and operates covertly for a period of time for malicious purposes. Detecting file prospecting is thus important for preventing and remediating data loss and persistent threats. More specifically, detecting malicious file prospecting activity can prevent significant damages to a company.

Currently, no general purpose techniques exist for detecting file prospecting, much less distinguishing between legitimate and malicious uses thereof. Monitoring file accesses by users involves an unlabeled, noisy, mixture of normal activity, including legitimate prospecting through the organization's file resources by various authorized parties, as well as the possibility of abnormal prospecting activity. This being the case, ground truth labels for user access activities are lacking, and it is not practicable to attempt to create them for all file system access activity by all users within an organization. Thus, conventional supervised learning techniques are not applicable or suited for use in the detection of file prospecting.

Conventional file access management systems detect when a specific user accesses a file or folder which that user does not typically access. However, these systems require long windows of time (months or even years) to establish which file system objects each user typically accesses. Even then, the system does not identify file prospecting or open-ended browsing, but instead only an anomalous access of a given file system object. Other conventional systems monitor the frequency with which specific files or folders are accessed, and trigger alerts if given thresholds are exceeded. Other systems flag the access of files with keywords in the file or path name. However, none of these systems are able to identify file prospecting activity, much less distinguish between patterns of access associated with legitimate versus malicious file prospecting.

It would be desirable to address these issues.

SUMMARY

Suspicious file prospecting activity is detected based on patterns of file system access. The access of one or more file system(s) by a specific user is monitored over a specific period (i.e., a period of time of a given length). The length of the period of time during which the user's file system access activity is monitored is a variable design parameter, which can set to different values in different embodiments as desired (e.g., 20 minutes, one hour, ten hours, etc.). During the period of time, every access by the user of any object (e.g., file, directory, mount point, etc.) in file system(s) can be monitored. An access sequence is recorded, comprising a record of the file accesses made by the user during the period of time. Each recorded file access can be represented as the path name of the file system object targeted by the corresponding file access operation (e.g., open, read, write, copy, move, etc.). For example, each file access can be represented in the access sequence as a full path name. In one embodiment, other information such as an identification of the corresponding file system access operation is also recorded for each file access in the sequence.

Distances between the file accesses recorded in the access sequence are determined. This can take the form of determining lexicographic distances between path names of targets of successive accesses. For example, a string metric or edit distance function can be applied to targets of successive access operations, with each target represented as a string containing the full path name. Distances can also or instead be determined as mathematical, logical distances between points in the file system targeted by successive accesses. When determining distances, various factors concerning differences between accesses can be weighted. In one embodiment, differences between successive accesses are weighted based on their corresponding file system access operations, for example, with write operations being weighted more heavily than reads. In another embodiment, differences are weighted based on their respective positions within the path names of the targets, for example with differences located towards the beginning or left of the path name (i.e., towards the root) being weighted more heavily than differences located towards the end or right (i.e., towards the file name). A distance sequence is recorded, comprising a record of the determined distances. This sequence of distances is representative of a pattern of access of objects in the file system by the specific user during the given period of time. In other words, distances between sequential accesses of the file system are a way of representing the user's pattern of access, as opposed to logging specific, isolated accesses of specific files and folders. In one embodiment, the distance sequence is represented as a sequence of lengths, by prepending a zero.

The distance sequence is reduced to one or more baseline statistics describing the pattern of the user's access of the file system(s) during the given period of time. For example, one or more of the following statistics concerning the distance sequence can be calculated: entropy, maximum, median, mean, standard deviation and count. The statistic(s) is/are a statistical description of the pattern of the user's access during the monitored time period. These calculated statistics can thus be used as a baseline for the user's pattern of file system access.

At least one subsequent anomaly in the user's access of the file system(s) is detected, by comparing at least one subsequently calculated statistic representing at least one subsequent pattern of the user's file system access to the at least one baseline statistic. This detection can take the form of subsequently repeating the monitoring, recording, determining and reducing steps over a second, subsequent period of time of the same specific length. The repetition of these steps over a subsequent time period results in one or more statistics describing a subsequent pattern of the user's access of the file system(s). The statistic(s) describing the subsequent pattern of the user's access is compared to the baseline statistic(s). A detected anomaly in the user's access that deviates from the baseline statistic(s) by more than a given threshold can be interpreted as indicative of suspicious file prospecting activity. In response, a notification indicating detection of suspicious file prospecting activity can be transmitted, e.g., to an administrator or the like. The steps of monitoring, recording, determining, reducing and detecting are described above as being performed in conjunction with a single user's file system access activity. It is to be understood that these steps can be directed at file system accesses made by additional users, including all or specific subsets of the users within a given organization.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
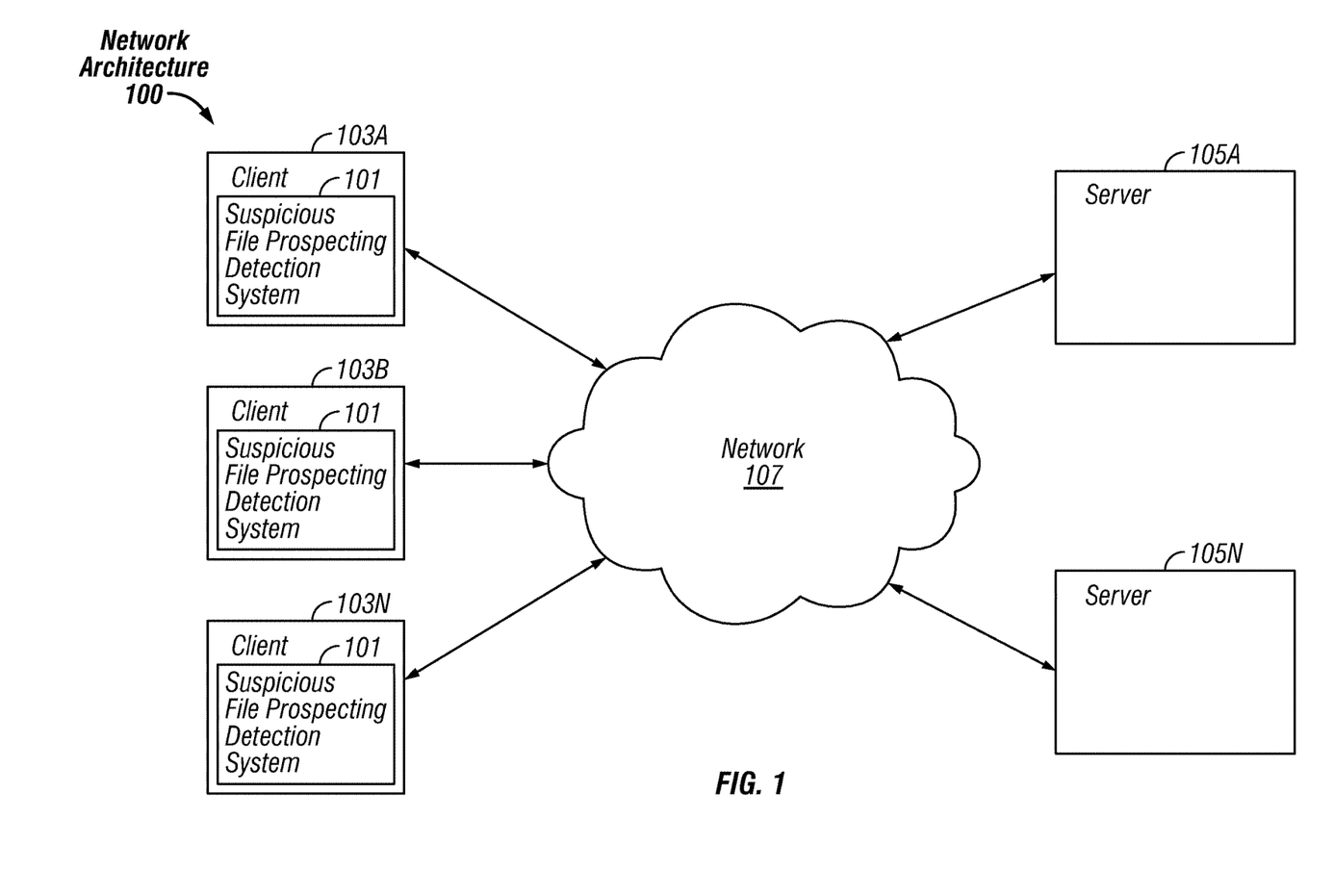
FIG. 1 is a block diagram of an exemplary network architecture in which a suspicious file prospecting detection system can be implemented, according to some embodiments.

FIG. 1 is a block diagram illustrating an exemplary network architecture 100 in which a suspicious file prospecting detection system 101 can be implemented. The illustrated network architecture 100 comprises multiple clients 103A, 103B and 103N, as well as multiple servers 105A and 105N. In FIG. 1, a suspicious file prospecting detection system 101 is illustrated as residing on each client 103. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
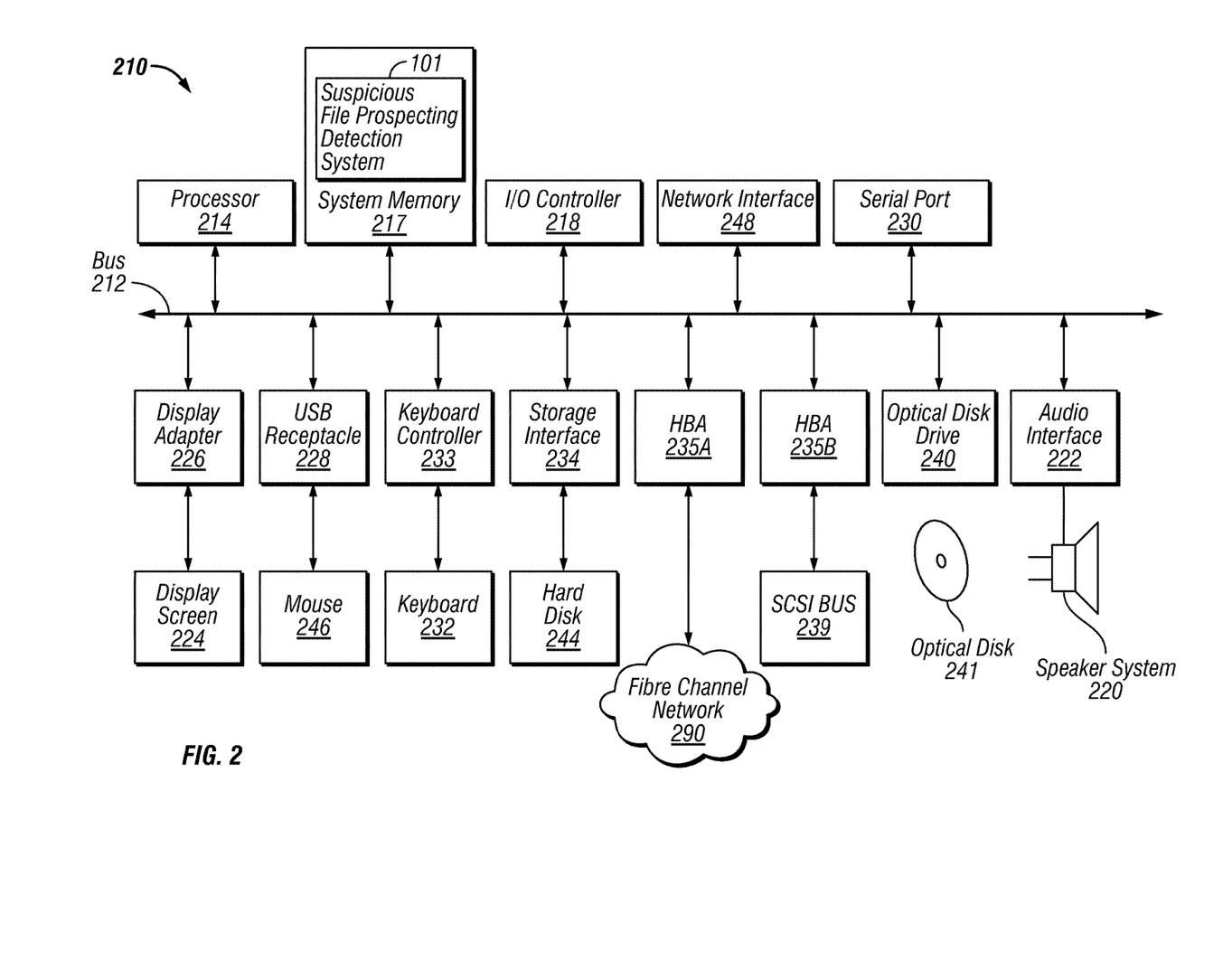
FIG. 2 is a block diagram of a computer system suitable for implementing a suspicious file prospecting detection system, according to some embodiments.

FIG. 2 is a block diagram of a computer system 210 suitable for implementing a suspicious file prospecting detection system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 241, flash memory) and loaded into system memory 217 and executed by the processor 214. Application programs can also be loaded into system memory 217 from a remote location (i.e., a remotely located computer system 210), for example via the network interface 248. In FIG. 2, the suspicious file prospecting detection system 101 is illustrated as residing in system memory 217. The workings of the suspicious file prospecting detection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
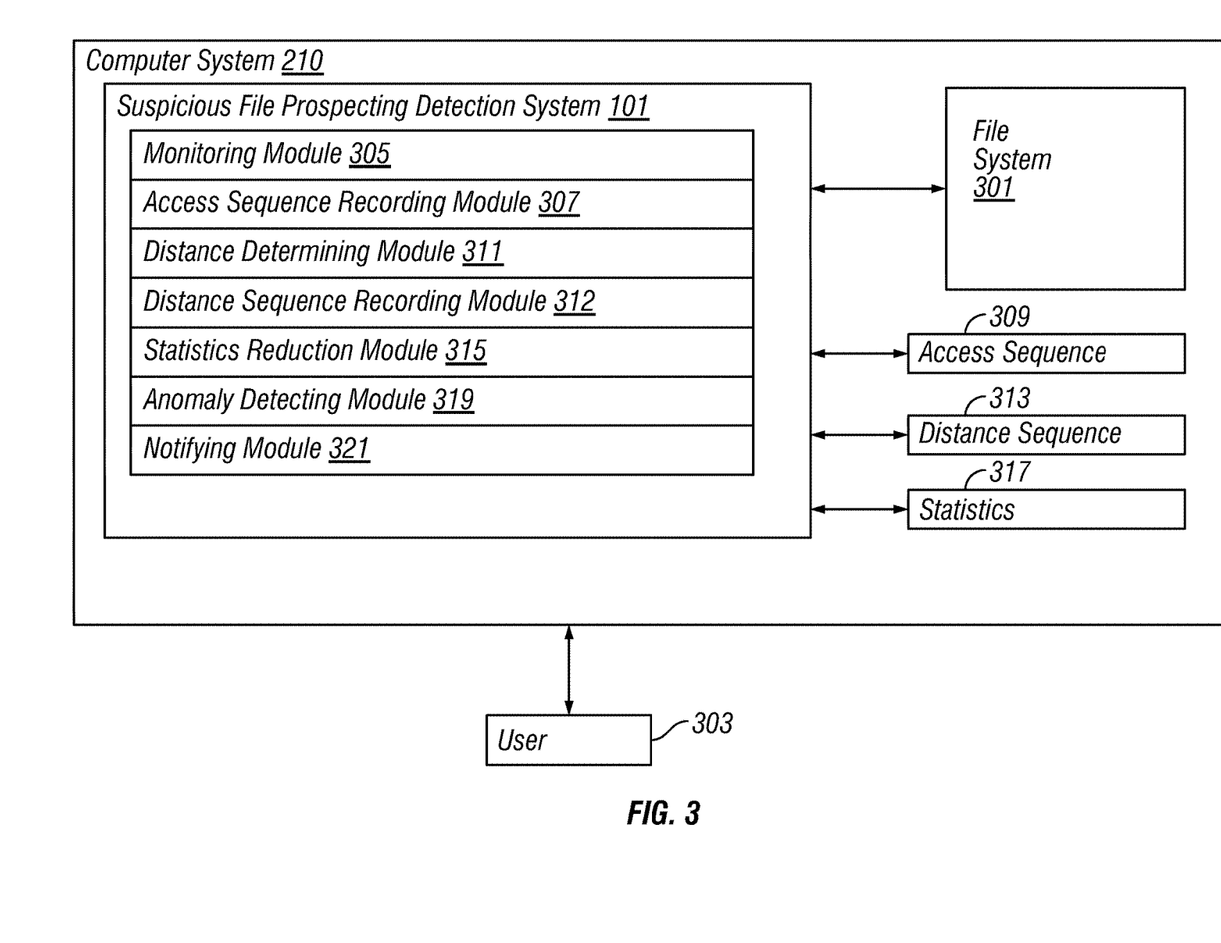
FIG. 3 is a high level block diagram of the operation of a suspicious file prospecting detection system, according to some embodiments.

FIG. 3 illustrates the operation of a suspicious file prospecting detection system 101 running on a computer system 210. As described above, the functionalities of the suspicious file prospecting detection system 101 can reside on specific computers 210 or be otherwise distributed between multiple computer systems 210, including within a fabric/cloud-based computing environment in which the functionality of the suspicious file prospecting detection system 101 is provided as a service over a network 107. It is to be understood that although the suspicious file prospecting detection system 101 is illustrated in FIG. 3 as a single entity, the illustrated suspicious file prospecting detection system 101 represents a collection of functionalities, which can be instantiated as a single or multiple modules as desired (instantiation of a specific, multiple module suspicious file prospecting detection system 101 is illustrated in FIG. 3). It is to be understood that the modules of the suspicious file prospecting detection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the suspicious file prospecting detection system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As described in the detail below, the suspicious file prospecting detection system 101 establishes behavioral baseline patterns of file system 301 access for specific users 303 over a period of time, and then identifies anomalous patterns of file system 303 access in order to detect and flag suspicious file prospecting activity. The suspicious file prospecting detection system 101 characterizes the expected file system 301 activity of a given user 301 by summarizing the user's activity pattern within one or more file systems during a given window of time. A subsequent access pattern that deviates from the established norm then triggers an alert. The use of pattern level anomaly detection enables the suspicious file prospecting detection system 101 to identify deviations from normal file system access behavior, without relying on supervised learning. By examining patterns of activity rather than single events, the suspicious file prospecting detection system 101 implicitly captures a normal mixture of behavior to use as a baseline. Deviations from the user specific baseline are then detected as anomalous.

More specifically, in order to establish a baseline pattern of file system access activity for a given user 303, a monitoring module 305 of the suspicious file prospecting detection system 101 monitors the user's access of the file system(s) 301 of interest over a given period of time. During the given time period, the monitoring module 305 can monitor every access (e.g., open, read, write) of any object (e.g., file, folder, directory, mount point) in the file system(s) 301 by the specific user 303. The monitoring module 305 can use different techniques in different embodiments to monitor the user's access of the file system 301, such as a file system filter driver (e.g., in a Windows based embodiment), interception of relevant system calls (e.g., in a Linux based embodiment), etc. The level at which file system operations are monitored can also vary between embodiments as desired (e.g., application level operations, operating system level operations, etc.). Additionally, the monitoring module 305 can distinguish (or not) between different file system access operations (e.g., open, read, write, execute, seek, copy, move, delete, list, mount, etc.) at varying levels of specificity in different embodiments as desired. For example, in one embodiment, the monitoring module 305 only detects the identity of the specific file system object that is being accessed, whereas in other embodiments, the specific access operation being executed is also recorded.

Based on the above-described monitoring, an access sequence recording module 307 of the suspicious file prospecting detection system 101 records a sequence 309 of file accesses made by the specific user 303 during the given time period. For example, if during a given monitoring period a specific user accesses files A/B/C, A/B/D, C/D/F and E/G/Q in that order, the access sequence 309 S would be: S=(A/B/C, A/B/D, C/D/F, E/G/Q). Note that here each term (e.g., A/B/C) refers to a full path name of a file located in a remote or local file system (e.g., "\\mountpoint\foo\bar"). In the above example, S is a sequence 309 of four access operations. In practice, the number of accesses in a recorded access sequence 309 can be much higher, depending upon the activities executed by the user 303 and the length of period of time during which monitoring occurs. The period of time is a variable design parameter which can be adjusted up or down as desired (e.g., 30 minutes, four hours, 24 hours, etc.). In some embodiments, the period of time is relatively short compared to those used in conventional systems (e.g., hours as opposed to months). Note also that in the example access sequence 309 S, the file accesses are represented as path names of the file system objects targeted by the corresponding monitored operations, but access sequences 309 recorded by the access sequence recording module 307 can contain additional or different information, for example information identifying the given access operations performed, e.g., $S_{OPERATIONS}$=(A/B/C$_{READ}$, A/B/D$_{LIST}$, C/D/F$_{WRITE}$ E/G/Q$_{MOUNT}$).

Once the sequence of accesses 309 has been recorded, a distance determining module 311 of the prospecting detection system 101 determines a lexicographic or mathematical distance between each successive access in the access sequence 309. In other words, a distance function is applied to measure how logically "far" two successive accesses are from one another. Based on the distance determining module 311 determining the distances between the successive accesses in the access sequence 309, a distance sequence recording module 312 of the suspicious file prospecting detection system 101 records a sequence of distances, or distance sequence 313. As described in more detail below, a distance sequence 313 is a record of the determined distances between successive accesses, which can be in various different formats in different embodiments as desired.

In some embodiments, the distance determining module 311 determines distances by applying a string metric or edit distance function to the targets of successive access operations, with each target represented as a string containing the full path name of the accessed file system object. For example, in one embodiment the distance determining module 311 calculates the Levenshtein distance between successively accessed file path names. The Levenshtein distance measures the distance between two strings as the minimum number of single character insertions, deletions or substitutions that are required to edit one string into the other. In the example of access sequence 309 S=(A/B/C, A/B/D, C/D/F, E/G/Q), the distance determining module 311 would first calculate the Levensthein distance between the full path names of the first two accessed files A/B/C and A/B/D, which is 1, because the first string "A/B/C" can be edited into the second string "A/B/D" by a single character substitution (i.e., substitute a 'D' for the final 'C' of the first string). The remaining Levensthein distances are then calculated, resulting in a new distance sequence 313 dS, where dS=(1, x, x).

It is to be understood that the above-described Levensthein distance embodiment is just an example, and in other embodiments other distance functions can be applied. For example, Damerau-Levenshtein distance allows for transposition of two adjacent characters as a single operation, in addition to insertion, deletion and substitution. Longest common subsequence distance is edit distance in which insertion and deletion are the only permitted operations. Hamming distance only permits substitutions, and Jaro-Winkler distance only permits transpositions. Different ones of these and other edit distance functions can be used in different embodiments. In some embodiments, differences between strings are weighted based on their positions in the path names, for example with differences located towards the beginning or left of the string (i.e., towards the root of the path) being weighted more heavily than differences located towards the end or right (i.e., towards the file name). In some distance functions, different operations are assigned weights (e.g., transposition counts as 1.1 operations and substitution as 0.9, etc.).

In some embodiments factors other than or in addition to edit distance are used to calculate distance between file system objects. For example, mathematical representations of the logical distance between two points in a file system other than the number of lexicographical operations necessary to edit one path name into another can be used. In embodiments in which the specific operation that was performed on the file is taken into account as well as the file itself, a logical distance between access operations can also be calculated and factored into the distance between accesses (e.g., with different operations or combinations thereof having different numerical weights). In one embodiment, the distance sequence 313 dS is represented as a sequence of lengths by prepending a 0, i.e., where dS=(1, x, x), length(dS)=length(S)=(0, 1, x, x). It is to be understood that the sequence of distances 313 dS is representative of a pattern of access of objects in the file system 301 by the specific user 303 during the given window of time. In other words, distances between sequential accesses of the file system 301 are a way of representing the user's pattern of access, as opposed to logging specific, isolated accesses of specific files and folders.

A statistics reduction module 315 of the prospecting detection system 101 reduces the distance sequence 313 dS to one or more statistics 317, $H_1 \ldots H_n$. For example, in one embodiment the statistics reduction module 315 reduces the distance sequence 313 to its entropy, by calculating the entropy of dS as H=entropy(dS). Other and/or additional statistics 317 are calculated in other embodiments, for example maximum, median, mean, standard deviation, count, etc. In some embodiments a distance sequence 313 is reduced to a single statistic 317, and in other embodiments multiple statistics 317 are calculated from the distance sequence 313 as desired. It is to be understood that the statistic(s) 317 to which a distance sequence 313 is reduced is/are a statistical description of the pattern of the user's access recorded in the access sequence 309. These calculated statistics 317 can thus be used as a baseline for the user's pattern of file system access. In some embodiments, new access sequences 309 are recorded for the user in rolling fashion, with each access sequence 309 being recorded during a fixed window of time as described above, and then used to determine a new distance sequence 313 and calculate corresponding statistics 317 which form a new baseline. How often to calculate new baseline statistics 317 is a variable design parameter.

After statistic(s) 317 have been calculated from the distance sequence 313, the monitoring module 305 continues to monitor the user's access of the file system(s) 301 as described above. Subsequent accesses during given periods of time are recorded as access sequences 309, used to determine distance sequences 313, and then to calculate corresponding statistics 317, all as described above. An anomaly detecting module 319 of the prospecting detection system 101 compares statistics 317 representing subsequent patterns of access to the baseline statistic(s), 317 and detects deviations from the baseline. The anomaly detecting module 319 can apply an anomaly detection algorithm to the calculated statistics 317, looking for deviations from the baseline. This will detect significant deviations from the baseline access pattern. For example, if the user 303 views or otherwise accesses multiple files in many directories logically far away from an expected primary working area, this activity would manifests itself as a change in statistics 317 calculated based on access sequences 309. A deviation from the baseline that exceeds a given threshold is interpreted as being indicative of suspicious file prospecting activity, resulting in the generation of an alert or other action as described below. The specific threshold to use in this capacity is a variable design parameter. Since some deviation from the baseline is to be expected in ongoing access of files over time, the point at which to set the threshold can be adjusted up and down depending upon factors such as the amount of deviation considered typical within a given organization, tolerance for false positives or false negatives, and the specific statistics 317 being utilized. Other factors can also be taken into account when determining whether to trigger an alert or take other action, such as the role of the user 303 within the organization, the sensitivity of the directories where the anomalies are occurring, the specific access operations being performed, etc. Such factors can be assigned different weights in different embodiments as desired.

In different embodiments different actions can be taken when the threshold indicating suspicious file prospecting activity is exceeded. For example, a notifying module 321 of the suspicious file prospecting detection system 101 can generate and transmit a notification to an administrator or the like, via any form of electronic communication such as email, text, phone, a notification on a user interface, etc. Where desired, the specifics and/or summarizations of the user's access activities that triggered the alert can be included in the communication and/or logged. In some embodiments, the user's access to the file system (or certain objects therein) can be restricted or eliminated.

Although the suspicious file prospecting detection system 101 is described above monitoring a single user 303, it is to be understood that the suspicious file prospecting detection system 101 can be deployed on multiple computers 210 throughout an organization (or run from one or more servers 105 or the cloud), such that multiple users 303 (e.g., all or a specific subset as desired) within the organization are monitored for suspect file prospecting activity.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting suspicious file prospecting activity by a user based on patterns of file system access, the method comprising:
    monitoring, by a computer, access of at least one file system by the user over a period of time of a specific length;
    recording, by the computer, an access sequence comprising a record of file accesses made by the user during the period of time, each file access represented as at least a path name of a file system object targeted by a corresponding file access operation;
    determining, by the computer, distances between the file accesses recorded in the access sequence, wherein determining distances between the file accesses recorded in the access sequence further comprises determining lexicographic distances between path names of targets of successive accesses, and determining mathematical, logical distances between file system objects in a file system targeted by successive accesses;
    recording, by the computer, a distance sequence comprising a record of the determined distances;
    reducing, by the computer, the distance sequence to at least one baseline statistic describing a pattern of the user's access of the at least one file system during the period of time;
    detecting, by the computer, at least one subsequent anomaly in the user's access of the at least one file system, by comparing at least one subsequently calculated statistic representing at least one subsequent pattern of the user's file system access to the at least one previously calculated baseline statistic; and
    in response to detecting the at least one subsequent anomaly in the user's access of the at least one file system, taking at least one action, by the computer, from a group of actions consisting of: restricting the user's access to the at least one file system and eliminating the user's access to the at least one file system.

2. The method of claim 1 wherein monitoring access of at least one file system by the user over a period of time of a specific length further comprises:
    monitoring every access of any object in the at least one file system by the user during the period of time.

3. The method of claim 1 wherein recording an access sequence comprising a record of file accesses made by the user during the period of time further comprises:
    representing each file access as a full path name of the file system object targeted by the corresponding file access operation.

4. The method of claim 1 wherein recording an access sequence comprising a record of file accesses made by the user during the period of time further comprises:
    for each recorded file access, recording an identification of the corresponding file system access operation.

5. The method of claim 1 wherein determining distances between the file accesses recorded in the access sequence further comprises:
    applying a string metric or edit distance function to targets of successive access operations, with each target represented as a string containing a full path name.

6. The method of claim 1 wherein determining distances between the file accesses recorded in the access sequence further comprises:
    with accesses represented as strings containing full path names of accessed targets, weighting differences between successive access operations based on their respective positions within the path names.

7. The method of claim 1 wherein determining distances between the file accesses recorded in the access sequence further comprises:
    weighting differences between successive access operations based on their corresponding file system access operations.

8. The method of claim 1 wherein recording a distance sequence comprising a record of the determined distances further comprises:
    representing the distance sequence as a sequence of lengths by prepending a zero.

9. The method of claim 1 wherein reducing the distance sequence to at least one baseline statistic describing a pattern of the user's access of the at least one file system during the period of time further comprises:
    calculating at least one of the following statistics concerning the distance sequence: entropy, maximum, median, mean, standard deviation and count.

10. The method of claim 1 wherein detecting at least one subsequent anomaly in the user's access of the at least one file system by comparing at least one subsequently calculated statistic representing at least one subsequent pattern of the user's file system access to the at least one baseline statistic further comprises:
    interpreting a detected anomaly in the user's access that deviates from the at least one baseline statistic by more than a given threshold as being indicative of suspicious file prospecting activity.

11. The method of claim 1 wherein detecting at least one subsequent anomaly in the user's access of the at least one file system by comparing at least one subsequently calculated statistic representing at least one subsequent pattern of the user's file system access to the at least one baseline statistic further comprises:
    subsequently repeating the monitoring, recording, determining and reducing steps over a second, subsequent period of time of the specific length, resulting in at least one statistic describing a subsequent pattern of the user's access of the at least one file system during the subsequent period of time; and comparing the at least one statistic describing a subsequent pattern of the user's access to the at least one baseline statistic.

12. The method of claim 1 further comprising:
responsive to detecting at least one subsequent anomaly in the user's access of the at least one file system, transmitting a notification indicating detection of suspicious file prospecting activity.

13. The method of claim 1 further comprising:
performing the monitoring, recording, determining, reducing and detecting steps directed at file system accesses made by additional users.

14. At least one non-transitory computer readable medium for detecting suspicious file prospecting activity by a user based on patterns of file system access, the at least one non-transitory computer readable medium storing computer executable instructions that, when loaded into computer memory and executed by at least one processor of at least one computing device, cause the at least one computing device to perform the following steps:
monitoring access of at least one file system by the user over a period of time of a specific length;
recording an access sequence comprising a record of file accesses made by the user during the period of time, each file access represented as at least a path name of a file system object targeted by a corresponding file access operation;
determining distances between the file accesses recorded in the access sequence, wherein determining distances between the file accesses recorded in the access sequence further comprises determining lexicographic distances between path names of targets of successive accesses, and determining mathematical, logical distances between file system objects in a file system targeted by successive accesses;
recording a distance sequence comprising a record of the determined distances;
reducing the distance sequence to at least one baseline statistic describing a pattern of the user's access of the at least one file system during the period of time;
detecting at least one subsequent anomaly in the user's access of the at least one file system, by comparing at least one subsequently calculated statistic representing at least one subsequent pattern of the user's file system access to the at least one previously calculated baseline statistic; and
in response to detecting the at least one subsequent anomaly in the user's access of the at least one file system, taking at least one action from a group of actions consisting of: restricting the user's access to the at least one file system and eliminating the user's access to the at least one file system.

15. The at least one non-transitory computer readable medium of claim 14 further storing computer executable instructions for:
applying a string metric or edit distance function to targets of successive access operations, with each target represented as a string containing a full path name.

16. The at least one non-transitory computer readable medium of claim 14 further storing computer executable instructions for:
interpreting a detected anomaly in the user's access that deviates from the at least one baseline statistic by more than a given threshold as being indicative of suspicious file prospecting activity.

17. The at least one non-transitory computer readable medium of claim 14 further storing computer executable instructions for:
subsequently repeating the monitoring, recording, determining and reducing steps over a second, subsequent period of time of the specific length, resulting in at least one statistic describing a subsequent pattern of the user's access of the at least one file system during the subsequent period of time; and
comparing the at least one statistic describing a subsequent pattern of the user's access to the at least one baseline statistic.

18. A computer system for detecting suspicious file prospecting activity by a user based on patterns of file system access, the computer system comprising:
a processor;
system memory;
a monitoring module residing in the system memory, the monitoring module being programmed to monitor access of at least one file system by the user over a period of time of a specific length;
an access sequence recording module residing in the system memory, the access sequence recording module being programmed to record an access sequence comprising a record of file accesses made by the user during the period of time, each file access represented as at least a path name of a file system object targeted by a corresponding file access operation;
a distance determining module residing in the system memory, the distance determining module being programmed to determine distances between the file accesses recorded in the access sequence, wherein determining distances between the file accesses recorded in the access sequence further comprises determining lexicographic distances between path names of targets of successive accesses, and determining mathematical, logical distances between file system objects in a file system targeted by successive accesses;
a distance sequence recording module residing in the system memory, the distance sequence recording module being programmed to record a distance sequence comprising a record of the determined distances;
a statistics reduction module residing in the system memory, the statistics reduction module being programmed to reduce the distance sequence to at least one baseline statistic describing a pattern of the user's access of the at least one file system during the period of time; and
an anomaly detecting module residing in the system memory, the anomaly detecting module being programmed to detect at least one subsequent anomaly in the user's access of the at least one file system, by comparing at least one subsequently calculated statistic representing at least one subsequent pattern of the user's file system access to the at least one previously calculated baseline statistic, and being programmed to, in response to detecting the at least one subsequent anomaly in the user's access of the at least one file system, taking at least one action from a group of actions consisting of: restricting the user's access to the at least one file system and eliminating the user's access to the at least one file system.

* * * * *